(12) United States Patent
Menezes et al.

(10) Patent No.: US 6,231,184 B1
(45) Date of Patent: May 15, 2001

(54) PROGRESSIVE ADDITION LENSES

(75) Inventors: Edgar Menezes, Roanoke, VA (US);
Daniel Katzman, Haemek (IL);
William Kokonaski, Roanoke, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/439,479

(22) Filed: Nov. 12, 1999

(51) Int. Cl.[7] .................................................. G02C 7/06
(52) U.S. Cl. ............................................ 351/169; 351/177
(58) Field of Search .................................. 351/168, 169, 351/170, 171, 172, 177

(56) References Cited

U.S. PATENT DOCUMENTS

| 3,711,191 | 1/1973 | Tagnon ................................. 351/169 |
| 4,055,379 | 10/1977 | Winthrop ............................. 351/169 |
| 4,056,311 | 11/1977 | Winthrop ............................. 351/169 |
| 4,062,629 | 12/1977 | Winthrop ............................. 351/169 |
| 4,253,747 | 3/1981 | Maitenaz ............................. 351/169 |
| 4,461,550 | 7/1984 | Legendre ............................. 351/169 |
| 4,806,010 | 2/1989 | Ewer et al. ......................... 351/169 |
| 4,859,261 | 8/1989 | Ace ..................................... 351/172 |
| 4,906,090 | 3/1990 | Barth ................................... 351/169 |
| 4,946,270 | 8/1990 | Guillino et al. ..................... 351/169 |
| 4,952,048 | 8/1990 | Frieder et al. ....................... 351/177 |
| 5,305,028 | 4/1994 | Okano ................................. 351/169 |
| 5,726,734 | 3/1998 | Winthrop ............................. 351/169 |
| 5,771,089 | 6/1998 | Barth ................................... 351/169 |
| 5,844,657 | 12/1998 | Shirayanagi ........................ 351/169 |
| 5,886,766 | 3/1999 | Kaga et al. ......................... 351/169 |
| 5,926,250 | 7/1999 | Mukaiyama et al. ............... 351/169 |
| 6,106,118 | * 8/2000 | Menezes et al. .................... 351/169 |
| 6,149,271 | * 11/2000 | Menezes et al. .................... 351/169 |

FOREIGN PATENT DOCUMENTS

| 0 578 833 A1 | 1/1994 | (EP) . |
| 0 809 126 A1 | 11/1997 | (EP) . |
| 0 414 890 B1 | 1/1998 | (EP) . |
| 857993 | 8/1998 | (EP) . |
| 775007 | 5/1957 | (GB) . |
| 63-254415A | 10/1988 | (JP) . |
| 05303063 | 11/1993 | (JP) . |
| WO 98/12591 | 3/1998 | (WO) . |
| WO 98/22848 | 5/1998 | (WO) . |

* cited by examiner

*Primary Examiner*—Scott J. Sugarman

(57) ABSTRACT

The invention provides progressive addition lenses in which unwanted lens astigmatism is reduced and channel width is increased. The astigmatism reduction and channel width increase are achieved without functional compromise of the distance and reading zone widths, as compared to conventional progressive addition lenses.

19 Claims, 8 Drawing Sheets

# PROGRESSIVE ADDITION LENSES

FIELD OF THE INVENTION

The present invention relates to multifocal ophthalmic lenses. In particular, the invention provides progressive addition lenses in which unwanted lens astigmatism is reduced and channel width increased without functional compromise of the distance and reading zone widths, as compared to conventional progressive addition lenses.

BACKGROUND OF THE INVENTION

The use of ophthalmic lenses for the correction of ametropia is well known. For example, multifocal lenses, such as progressive addition lenses ("PAL's"), are used for the treatment of presbyopia. The surface of a PAL provides far, intermediate, and near vision in a gradual, continuous progression of vertically increasing dioptric power from far to near focus, or top to bottom of the lens.

PAL's are appealing to the wearer because PAL's are free of the visible ledges between the zones of differing dioptric power that are found in other multifocal lenses, such as bifocals and trifocals. However, an inherent disadvantage in PAL's is unwanted lens astigmatism, or astigmatism introduced or caused by one or more of the lens' surfaces. Generally, the unwanted lens astigmatism is located on either side of the near vision zone of the lens and, at or near its approximate center, reaches a maximum level that corresponds approximately to the near vision dioptric add power of the lens.

A substantial portion of the known progressive lens designs utilize one curved-surface equation to express the shape of the lens' progressive addition surface. This design method permits shifting of the areas of maximum, localized, unwanted astigmatism to the least used areas of the lens. Alternatively, it is known to design a progressive addition lens by dividing the progressive addition surface into a number of areas and using a curved-surface equation for each area to express the progressive addition surface's shape. Use of either of these design methods results in significant amounts of maximum, localized unwanted astigmatism. Thus, a need exists for a PAL design method and lens that further reduces maximum, localized unwanted astigmatism compared to known methods and lenses.

BRIEF DESCRIPTION OF THE FIGURES

FIG. 1c is a cylinder map of the surface of FIG. 1a.

FIG. 2c is a cylinder map of the surface of FIG. 2a.

FIG. 3c is a cylinder map of the surface of FIG. 3a.

FIG. 4c is a cylinder map of the surface of FIG. 4a.

FIG. 5c is a cylinder map of the surface of FIG. 5a.

FIG. 6c is a cylinder map of the surface of FIG. 5a.

DESCRIPTION OF THE INVENTION AND ITS PREFERRED EMBODIMENTS

Figure 1A:
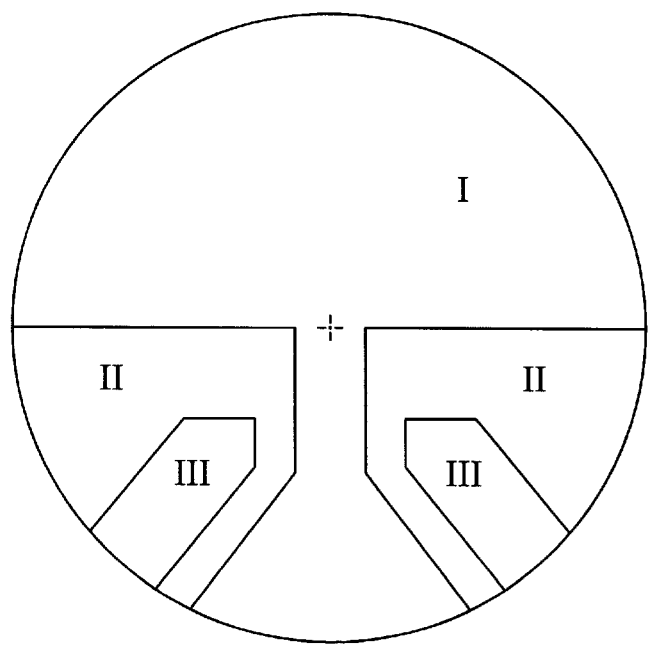
FIG. 1a is a weighting function map of a surface used in the lens of the invention.

The present invention provides progressive addition lenses, as well as methods for their design and production, in which the maximum, localized unwanted astigmatism that is associated with a given dioptric add power is reduced compared to conventional progressive lenses. Additionally, the lenses of the invention have a channel width that is increased in comparison to conventional lenses. The reduction in astigmatism and increase in channel width is achieved without compromise of the distance and reading zone widths or of channel length.

For purposes of the invention, by "maximum, localized unwanted astigmatism" is meant the highest, measurable level of astigmatism in an area of unwanted astigmatism on a lens surface. By "channel" is meant the corridor of vision that is free of astigmatism of about 0.75 diopters or greater when the wearer's eye is scanning from the distance zone to the near zone and back. By "lens" or "lenses" is meant any ophthalmic lens including, without limitation, spectacle lenses, contact lenses, intraocular lenses and the like. Preferably, the lens of the invention is a spectacle lens.

For purposes of the invention, by "progressive addition surface" is meant a continuous, aspheric surface having far and near vision zones and a zone of increasing dioptric power connecting the far and near vision zones. By "dioptric add power" is meant the amount of dioptric power difference between the near and far vision zones of a progressive addition surface.

In one embodiment, the invention provides a process for producing a lens comprising, consisting essentially of, and consisting of the steps of: a.) providing refractive power distributions for at least a first and second progressive addition surface; b.) dividing the first and second progressive surfaces into a plurality of sections; c.) expressing the shape of each of the first and second progressive surfaces by use of curved-surface equations for each of the plurality of sections; d.) combining the first and second progressive addition surfaces to form a lens wherein at least a portion of the areas of maximum, localized unwanted astigmatism of one surface are misaligned with respect to the areas of maximum, localized unwanted astigmatism of the other surface. In another embodiment, the invention comprises, consists of, and consists essentially of a lens produced by the method of the invention.

By "misaligned" is meant that the areas of maximum, localized unwanted astigmatism of one surface are disposed to prevent substantial superposition, or coincidence with the maximum, localized unwanted astigmatism areas of the other progressive addition surfaces when the surfaces are combined to form a lens. Preferably, the misalignment is such that no area of maximum, localized unwanted astigmatism of one surface substantially coincides with that of the other surface when the surfaces are combined to form a lens.

This misalignment is achieved by designing each surface of the lens so that the areas of maximum, localized unwanted astigmatism are located at predetermined positions on the surface. The use of any one of a variety of known design methods and weighting functions permit this type of design. Preferably, however, the surfaces are designed using any design method that divides the surface into a number of sections and provides a curved-surface equation for each area. A suitable methods of this type is disclosed in U.S. Pat. No. 5,886,766 incorporated herein in its entirety by reference.

As a first step of the method of the invention, for each of the progressive surfaces used in the lens of the invention the refractive power distribution of the distance, near and intermediate portions of the surface are determined as well as base radii of curvature corresponding to the distance and near portions. The power distributions of the surfaces may be substantially the same or different. The surface is then divided into a plurality of continuous sections, or cells, the shape of which sections may be any shape but preferably are polygonal, more preferably triangular in shape. For each section, weighting functions are assigned that determine the local magnitude of the unwanted astigmatism permitted in that section. The magnitude permitted will depend on the location of the section on the surface and the desired function of the surface at that location.

The shape of the progressive addition surface then is expressed by use of a curved-surface equation for each section. The radii of curvature for the surface in each section are iteratively calculated using the equation and the weighting functions assigned to each section. The radii of curvature for each section may be adjusted during the calculation to achieve the permitted magnitude of unwanted astigmatism. After the surface curvatures are calculated, the surface is then combined with a complementary spherical, or sphero-cylindrical surface and a material refractive index is specified for the lens to inspect and optimize the surface using any known method. The procedure is used for each progressive addition surface used in forming the lens of the invention.

Each of the progressive addition surfaces used in the lens of the invention may be inspected and optimized for individual optical parameters including, without limitation, distance power, dioptric add power, viewing widths of the distance, near and intermediate viewing zones, magnitude and location of areas of unwanted astigmatism, channel length, and the like, and combinations thereof. One ordinarily skilled in the art will recognize that these optical parameters may be obtained using any one of a variety of methods, including ray trace analysis of the lens-eye system, contour mapping, Modulation Transfer Function mapping instruments, and the like, and combinations thereof. The optical parameters to be optimized may depend on the sphero-cylindrical prescription and the viewing habits of the wearer. Additionally, the optical parameters to be optimized may depend on the dioptric add power of the lens.

Preferably, the radii of curvature of the distance and near zones, the weighting functions, or both, for an individual section are adjusted to optimize individual optical parameters. The weighting functions are numerical weights applied to each section. For example, and without limitation, weighting functions ranging from a high value of about 1 to a low value of about 10,000 may be used. The weighting functions used for a region of the surface may be different or the same as those of the other regions depending on the allowable unwanted astigmatism in that region. Thus, if the importance of astigmatism control in Region I, a region corresponding to the distance and near viewing zones and the center line of the channel in which the unwanted astigmatism is targeted to be between about 0 and 0.25 diopters, is x, the importance for Region II, the region at approximately the 0–180 degree line and the sides of the channel in which the unwanted astigmatism is to be about 0.25 to about 0.75 diopters, may be about 200x and in Region III, the region in which the maximum unwanted astigmatism is to be located, about 2000x.

In a final step, the individual surfaces are combined to form a lens. The progressive addition surfaces used in a lens may each be independently on the convex or concave surface of the lens, in a layer between the outer concave and outer convex surfaces of the lens, on the convex or concave surface and a layer between the concave and convex surfaces, or any combination thereof. The surfaces may be of the same material or of materials of different refractive indices. In the case in which a progressive addition surface is in a layer between the convex and concave surfaces of the lens, preferably the materials used for the layer and the convex and concave surfaces are different in refractive indices about 0.01 to about 0.1, preferably about 0.05 to about 0.1.

Other surfaces, such as spheric and toric surfaces, designed to adapt the lens to the ophthalmic prescription of the lens' wearer may be used in combination with, or in addition to, one or more of the progressive addition surfaces. In the case in which toric progressive concave surfaces are used, preferably, the surfaces are produced so that a toric progressive surface is not provided at each cylinder axis degree. Rather, a cylinder axis within a set number of degrees of the lens wearer's required cylinder axis is used, preferably within about 0 to about 25 degrees, preferably about 0 to about 20 degrees, more preferably about 0 to about 11 degrees of the required cylinder axis desired for the lens' wearer. More preferably, the cylinder axis orientation selected is one of a group of orientations that is less than the 180 possible orientations, more preferably the axis being one of a group of about 20 orientations, and most preferably the orientation is at 9, 27, 45, 63, 81, 99, 117, 153, or 171 relative to the three o'clock position.

For example, a concave progressive addition surface may be provided with a cylinder axis at 9, 27, 45, 63, 81, 99, 117, 153, or 171 degrees relative to the three o'clock position on the surface and the near vision zone center is located along the 270 degree axis, the six o'clock position. A convex progressive addition surface is provided for the lens, preferably by using a mold suitable for casting the surface. The mold's near vision zone may be provided at any convenient position but preferably is at a position that is aligned with the near viewing pupil position of the lens wearer. Typically, this position will be on either side of the 270 degree axis, the 6 o'clock position, of the mold depending on whether a left or right lens is being fabricated. Preferably, the position is within about 0 to about 20, more preferably about 5 to about 15, most preferably about 8 to about 10 degrees on either side of the 270 degree axis.

The concave surface is positioned, or rotated, in relation to the convex surface, or the mold used to cast the convex surface selected, so that the cylinder axis of the resulting lens will be that required by the lens wearer. For example, if the lens wearer's required cylinder axis is 180 degrees for the left eye and the concave surface cylinder power is at the 9 degree axis, with the near vision zone at 270 degrees, the surface is rotated so that its cylinder axis falls along a mold's 180 degree axis and the convex surface is then cast using the mold.

The individual surfaces used to form the lens of the invention may each independently be of a hard design, a soft design, or a composite surface design, which composite surface is formed by combining soft and hard designs, as disclosed in U.S. Pat. No. 5,726,734, incorporated herein in its entirety by reference. Additionally, the individual surfaces each may have a spherical or aspherical distance vision zone, short or long channel lengths, locations of maximum, localized unwanted astigmatism closer to the distance or near viewing zone, or combinations thereof. The choice of the preferred optical parameters for each surface may be customized to the needs of the lens wearer.

In a preferred embodiment, the lens of the invention has convex and concave progressive addition surfaces. In this embodiment, the convex surface may be of a symmetric or asymmetric soft design with an aspherical distance viewing zone and a short channel length of about 10 to about 20 mm. The maximum, localized unwanted astigmatism is located closer to the distance viewing zone than to the near viewing zone and preferably is on either side of the channel. More specifically, the maximum astigmatism is located superior to the point on the surface at which the dioptric add power of the surface's channel reaches about 50 percent of the dioptric add power of the surface. The distance viewing zone is aspherized to provide additional plus power of up to about 2.00 diopters, preferably up to about 1.00 diopters, and more preferably up to about 0.50 diopters. The aspherization may be outside of a circle centered at the fitting point and having a radius of about 10 mm, preferably about 15 mm, and more preferably about 20 mm. The concave surface is an asymmetrical or, preferably, an asymmetrical hard design with a spherical distance viewing zone and channel length of about 12 to about 22 mm. The distance viewing zone is designed to provide additional plus power of less than about 0.50 diopters, preferably less than about 0.25 diopters. The maximum, localized unwanted astigmatism is located closer to the near viewing zone, preferably on either side of the lower two-thirds of the channel.

The dioptric add power of each of the progressive addition surfaces used in the lenses of the invention is selected so that, when the surfaces are combined to form a lens, the dioptric add power of the resulting lens is substantially equal to the value needed to correct the lens wearer's near vision acuity. Additionally, the dioptric add power of each surface is selected in view of the maximum, localized unwanted astigmatism associated with a given near dioptric power. The dioptric add power of the progressive addition surfaces may be each independently from about +0.01 diopters to about +3.00 diopters, preferably from about +0.25 diopters to about +2.00 diopters, more preferably about +0.50 to about +1.50 diopters. The total dioptric add power of the lens may be split equally between the progressive surfaces. Alternatively, a single dioptric add power may be selected for the one of the progressive surface, such as the concave surface, and the dioptric add power of the other surface, such as the convex surface, may be adjusted so that the desired dioptric add power for the lens is obtained. In Table 1 is listed dioptric add power combinations using a concave surface having a dioptric add power of 0.75 diopters.

TABLE 1

| Lens Add | 1.00D | 1.50D | 2.00D | 2.50D | 3.00D | 3.50D |
|---|---|---|---|---|---|---|
| Convex Surface | 0.25D | 0.75D | 1.25D | 1.75D | 2.25D | 2.75D |
| Concave Surface | 0.75D | 0.75D | 0.75D | 0.75D | 0.75D | 0.75D |

In another embodiment, the lenses are constructed using one progressive surface that is a composite surface design and at least one additional progressive surface, which surface is not a composite surface design. For example, the convex lens surface may be a composite surface, each of the soft and hard designs used to form the surface having the dioptric add powers as set forth in Table 2. In this example, the concave surface of the lens is not a composite surface. A single dioptric add power may be selected for the concave surface and the dioptric add power of the composite surface adjusted so that the desired dioptric add power for the lens is obtained, as shown in Table 2.

TABLE 2

| Lens Add | 1.00D | 1.50D | 2.00D | 2.50D | 3.00D | 3.50D |
|---|---|---|---|---|---|---|
| Composite Surface | Soft Design 0.50D Hard Design 0.00D | Soft Design 0.75D Hard Design 0.25D | Soft Design 1.00D Hard Design 0.50D | Soft Design 1.25D Hard Design 0.75D | Soft Design 1.50D Hard Design 1.00D | Soft Design 1.75D Hard Design 1.25D |
| Concave Surface | 0.50D | 0.50D | 0.50D | 0.50D | 0.50D | 0.50D |

Each of the surfaces may be designed so that the location of the maximum, localized unwanted astigmatism of one surface of the lens is different from that of the other. Additionally or alternatively, the surfaces may be designed so that when they are shifted or rotated with respect to each other so that the areas of unwanted astigmatism are misaligned. Surfaces with the same maximum, localized unwanted astigmatism may be combined provided one surface is shifted or rotated with respect to the other. Preferably, the optical centers of the surfaces may be shifted either or both laterally or vertically with respect to each other. By "optical center" is meant the point on a surface intersected by the optical axis of the lens. As yet another alternative, maintaining the optical centers of the progressive surfaces coincident with each other, the centers may be rotated with respect to one another. The lateral and vertical shifts are done in such a way as to preserve the distance and near vision dioptric powers of the lens. In order to minimize the introduction of lens prism power, the shifts must occur so that the optical center of one progressive addition surface is shifted along a curve that is parallel to the distance curve of the other progressive addition surface. In the case of rotations, the surfaces are rotated about their optical centers so that the distance and near powers are substantially unaffected. Preferably, the surface with the lower location of unwanted astigmatism is shifted downwardly in relation to the other surface or the surface with the higher location of unwanted astigmatism is shifted upwardly of the surface having the higher location. The extent of the shifting or rotating must not be so large that an unacceptable level of prism is introduced into the lens. Typically, the shifting or rotating will be less than about 10 mm, preferably less than about 6 mm, more preferably less than about 4 mm.

The distance and near dioptric powers for each surface are selected so that when the surfaces are combined to form a lens, the powers of the lens are those needed to correct the wearer's distance and near vision. Generally, the distance dioptric power for each surface will be within the range of about 0.25 diopters to about 8.50 diopters. Preferably, the dioptric power of the distance zone of the concave surface may be + or − about 2.00 to about 7.00 diopters and for the convex surface, + or − about 0.5 to about 8.00 diopters. The near vision dioptric power for each of the surfaces will be about 1.00 diopters to about 12.00 diopters.

The progressive addition surfaces and lenses of the invention may be formed by any convenient method such as, without limitation, thermoforming, molding, grinding, casting or the like. In a preferred method, an optical preform having a progressive addition surface is used and at least a second progressive addition surface is cast onto the preform. Preferred methods for casting are disclosed in U.S. Pat. Nos. 5,147,585, 5,178,800, 5,219,497, 5,316,702, 5,358,672, 5,480,600, 5,512,371, 5,531,940, 5,702,819, 5,793,465, 5,859,685, 5,861,934, and 5,907,386 incorporated herein in their entireties by reference. In a more preferred method, a preform the concave surface of which is a progressive addition surface with a base spherical power and a cylinder power is used and a progressive addition surface is formed on the front surface by any convenient method, preferably by casting and more preferably by surface casting.

The invention will be clarified further by a consideration of the following, non-limiting examples.

EXAMPLES

EXAMPLE 1

For a first progressive addition concave surface, the refractive power distribution of the distance, near and intermediate portions of the surface were determined along with the base radii of curvature corresponding to this distribution, which distribution was 5.19 base curvature for the distance viewing zone and 4.21 diopters for the near viewing zone. The surface was then divided into a number of continuous sections and the surface's shape expressed using curved-surface equations for each section. The surface was then combined with a complementary spherical surface. The refractive index for the desired lens was specified to be 1.586. In FIG. 1a is depicted the weighting function map used for the surface.

Figure 1B:
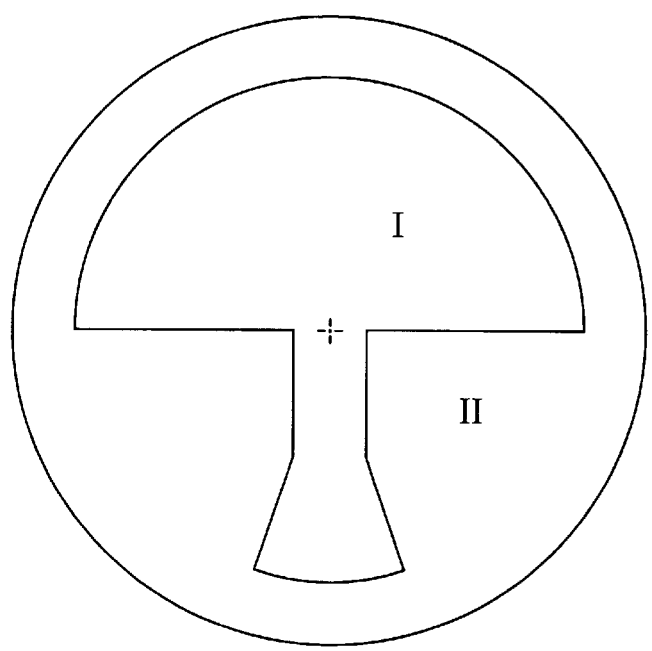
FIG. 1b is a weighting function map of another surface used in a lens of the invention.
Figure 1C:
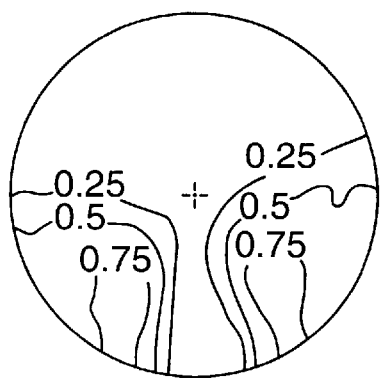

The distance zone for the first surface was spherical and the design was a hard design. The maximum, localized unwanted astigmatism was 0.93 diopters at x=−13 mm, y=−20 mm. The cylinder contour map for the surface is seen in FIG. 1c. The prism reference point used was x=0, y=0.

For a second progressive addition convex surface, the refractive power distribution of the distance, near and intermediate portions of the surface were determined along with the base radii of curvature corresponding to this distribution, which distribution was 4.80 base curvature for the distance viewing zone and 5.73 diopters for the near viewing zone. The surface was then divided into a number of continuous sections and the surface's shape expressed using curved-surface equations for each section. The surface was then combined with a complementary spherical surface. In FIG. 1b is depicted the weighting function map used for the surface.

Figure 1D:
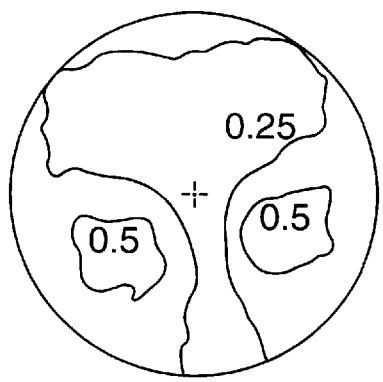
FIG. 1d is a cylinder map of the surface of FIG. 1b.

The distance zone for the second surface was aspherical and the design was a soft design. The maximum, localized unwanted astigmatism was 0.74 diopters at x=−13 mm, y=−7 mm. The cylinder contour map for the surface is seen in FIG. 1d. The prism reference point used was x=0, y=0.

Figure 1E:
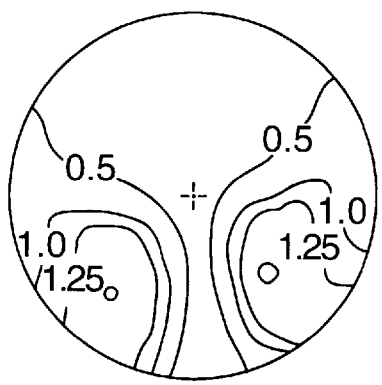
FIG. 1e is a cylinder map of the lens of Example 1.

In FIG. 1e is depicted the cylinder map for the lens produced by combining the first and second surfaces. The lens has a distance power of −0.07 diopters and +2.05 dioptric add power. The resulting lens contains a single, maximum, localized unwanted astigmatism area located on either side of the channel. The magnitude of this area is 1.52 diopters, a value less than the combined maximum of 1.67 diopter sum of the surface used to form the lens. The astigmatism is located at x=12.5 mm and y=−13.6 mm. The channel width listed on Table 3 for the lens is greater than that of a Varilux COMFORT® progressive addition lens. The other optical parameters for the lens listed on Table 3 are comparable to a Varilux COMFORT® lens.

TABLE 3*

| Parameter | Ex. 1 | Ex. 2 | Ex. 3a | Ex. 3b |
|---|---|---|---|---|
| Distance Width @ y = +10 deg. | 77.4 | 42.5 | 69.6 | 64.7 | 66.4 |
| Distance Width @ y = 0 deg. | 27.0 | 23.5 | 20.8 | 23.0 | 20.2 |
| Distance Width @ y = −10 deg. | 17.7 | 28.2 | 19.0 | 19.9 | 19.0 |
| Reading Width @ y = −30 deg. | 20.2 | 20.0 | 21.1 | 22.3 | 22.1 |
| Reading Width @ y = −40 deg. | 35.2 | 26.2 | 31.4 | 30.4 | 31.8 |
| Channel Width | 13.5 | 20.0 | 18.1 | 19.3 | 18.6 |

TABLE 3*-continued

| Parameter | Ex. 1 | Ex. 2 | Ex. 3a | Ex. 3b |
|---|---|---|---|---|
| Channel Length | 29.0 | 32.0 | 28.0 | 27.7 | 27.8 |
| Max. Astigmatism | 2.46 | 1.52 | 1.56 | 1.62 | 1.66 |
| Max. Astigmatism location | (16.8, −12.1) | (12.5, −13.6) | (15.3, −13.5) | (−14.0, −11.0) | (15.6, −7.3) |

*Linear dimensions are in degrees, powers in diopters, and coordinates in mm.

Example 2

Figure 2A:
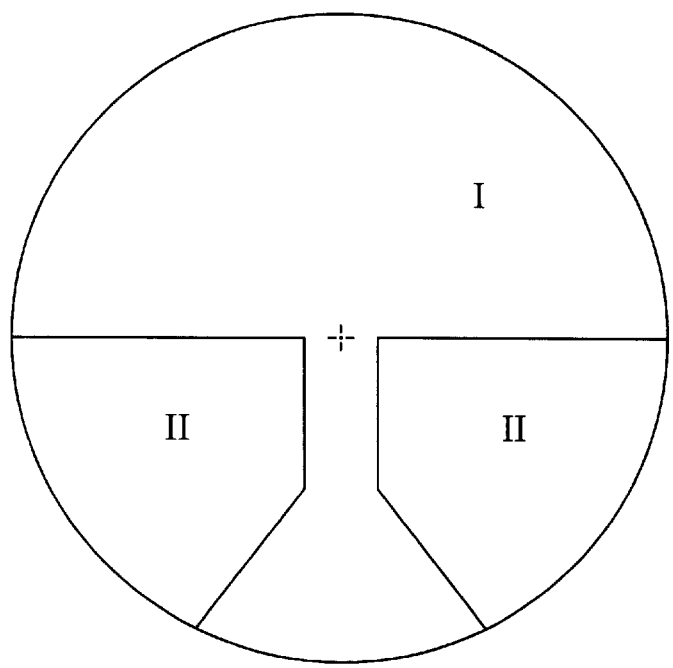
FIG. 2a is a weighting function map of a surface used in the lens of the invention.

For a first progressive addition concave surface, the refractive power distribution of the distance and near portions of the surface were determined along with the base radii of curvature corresponding to this distribution, which distribution was 113 mm base curvature for the distance viewing zone and 98.8 mm for the near viewing zone resulting in a 0.75 diopter add power for the surface. The procedure of Example 1 was used to complete the designing of the surface. In FIG. 2a is depicted the weighting function map used for the surface.

Figure 2B:
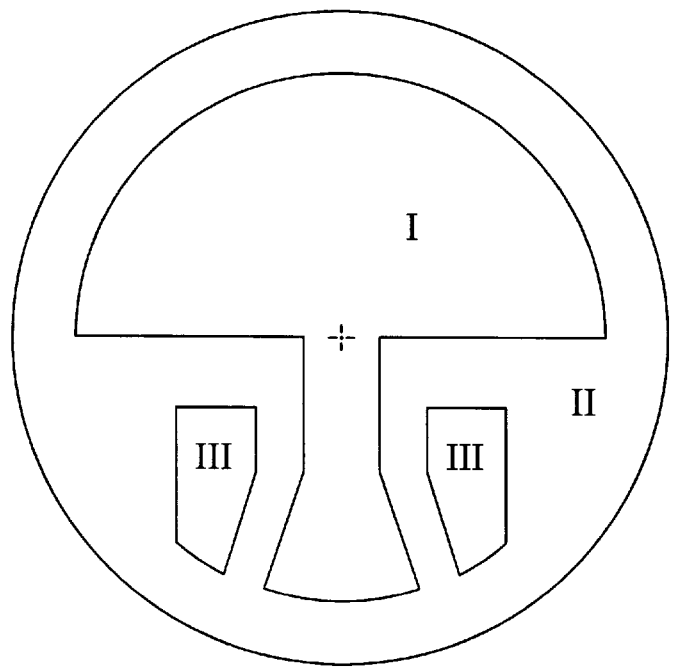
FIG. 2b is a weighting function map of another surface used in a lens of the invention.
Figure 2C:
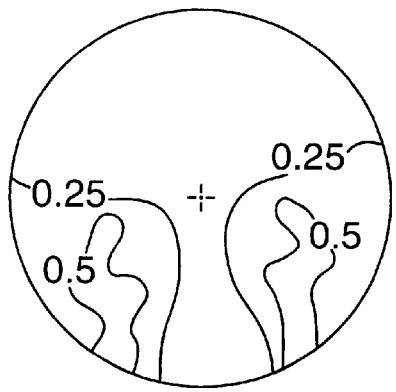

The distance zone for the first surface was spherical and the design was a hard design. The maximum, localized unwanted astigmatism was 0.67 diopters at $x=-15$ mm, $y=-7$ mm. The cylinder contour map for the surface is seen in FIG. 2c. The prism reference point used was $x=0$, $y=0$.

For a second progressive addition convex surface, the refractive power distribution of the distance and near portions of the surface were determined along with the base radii of curvature corresponding to this distribution, which distribution was 114.9 mm base curvature for the distance viewing zone and 92.3 mm for the near viewing zone resulting in a dioptric add power of 1.25 diopters. The procedure of Example 1 was used to complete the designing of the surface. In FIG. 2b is depicted the weighting function map used for the surface.

Figure 2D:
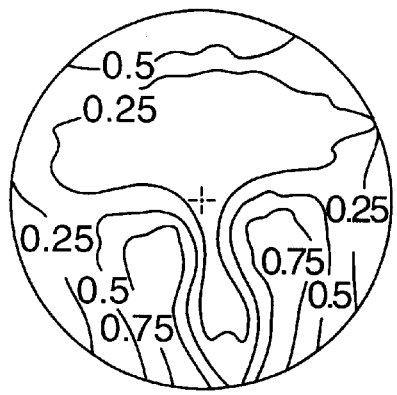
FIG. 2d is a cylinder map of the surface of FIG. 2b.

The distance zone for the second surface was aspherical and the design was a soft design. The maximum, localized unwanted astigmatism was 0.93 diopters at $x=13$ mm, $y=-10$ mm. The cylinder contour map for the surface is seen in FIG. 2d.

Figure 2E:
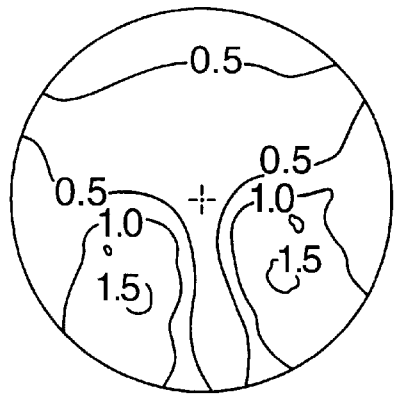
FIG. 2e is a cylinder map of the lens of Example 2.

In FIG. 2e is depicted the cylinder map for the lens produced by combining the first and second surfaces. The lens has a distance power of 0.02 diopters and +2.00 dioptric add power. The resulting lens contains two maximum, localized unwanted astigmatism areas located on either side of the channel. The magnitude of this area is 1.56 diopters, a value less than the combined maximum of 1.60 diopter sum of the surface used to form the lens. The astigmatism is located at $x=15.3$ mm and $y=-13.5$ mm. The channel width listed on Table 3 for the lens is greater than that of a Varilux COMFORT® progressive addition lens. The other optical parameters for the lens listed on Table 3 are comparable to a Varilux COMFORT® lens.

Examples 3a and 3b

The surfaces of Example 2 were used to provide the lenses of Examples 3a and 3b, but in forming the lens using these surfaces the convex and concave surfaces were misaligned by +−11.25 degrees for 3a and −11.25 for 3b corresponding to provision of 8 cylinder orientations for all toric prescriptions. In Example 3a, the convex surface was rotated 8 degrees counterclockwise to an inset to account for eye convergence during near viewing. The concave surface of Example 3a was further rotated counterclockwise +11.25 degrees relative to the convex surface. In Example 3b, the concave surface was rotated −11.25 degrees relative to the convex surface. The optical parameters for the lenses are shown on Table 3. Only minor differences were seen between the lenses of Example 3 and that of Example 2 demonstrating the feasibility of reducing the cylinder orientations to 8.

Example 4

Figure 3A:
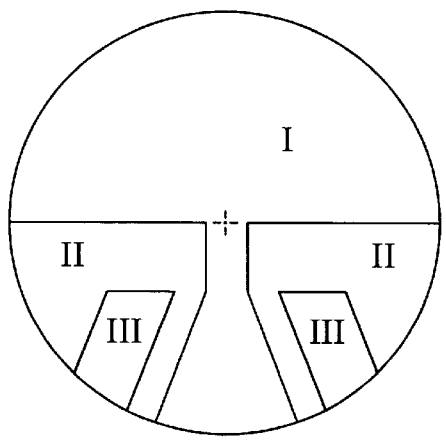
FIG. 3a is a weighting function map of a surface used in the lens of the invention.

For a first progressive addition concave surface, the refractive power distribution of the distance and near portions of the surface were determined along with the base radii of curvature corresponding to this distribution, which distribution was 112.9 mm base curvature for the distance viewing zone and 94.7 mm for the near viewing zone. The add power was +1.00 diopters. The procedure of Example 1 was used to complete the designing of the surface. In FIG. 3a is depicted the weighting function map used for the surface.

Figure 3B:
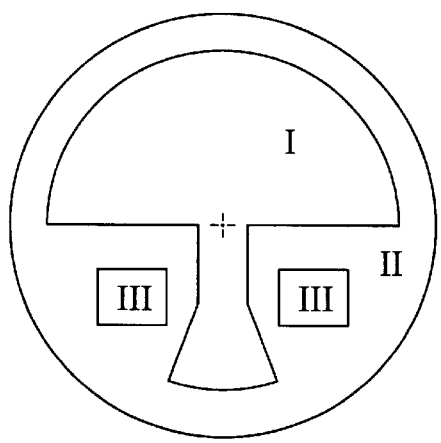
FIG. 3b is a weighting function map of another surface used in a lens of the invention.
Figure 3C:
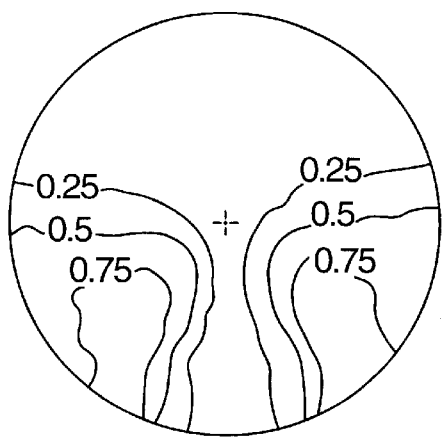
Figure 3D:
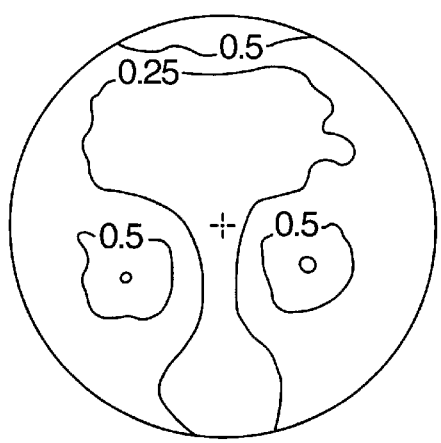
FIG. 3d is a cylinder map of the surface of FIG. 3b.

The distance zone for the first surface was spherical and the design was a hard design with a channel length of 28 degrees. The maximum, localized unwanted astigmatism was 0.96 diopters at $x=-14$ mm, $y=-16$ mm. The cylinder contour map for the surface is seen in FIG. 3c. The prism reference point used was $x=0$, $y=0$.

For a second progressive addition convex surface, the refractive power distribution of the distance and near portions of the surface were determined along with the base radii of curvature corresponding to this distribution, which distribution was 115.4 mm base curvature for the distance viewing zone and 96.4 mm for the near viewing zone. The add power was +1.00 diopters. The procedure of Example 1 was used to complete the designing of the surface. In FIG. 3b is depicted the weighting function map used for the surface.

The distance zone for the second surface was aspherical and the design was a soft design with a channel length of 32 degrees. The maximum, localized unwanted astigmatism was 0.77 diopters at $x=14$ mm, $y=-5$ mm. The cylinder contour map for the surface is seen in FIG. 1d. The prism reference point used was $x=0$, $y=0$.

Figure 3E:
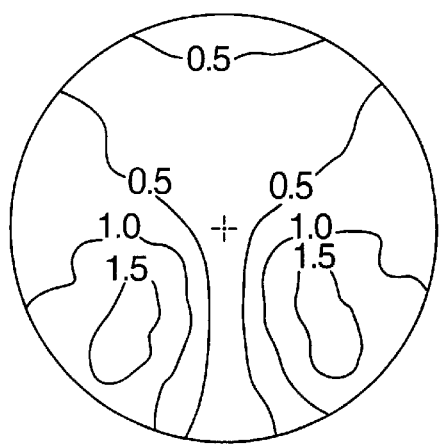
FIG. 3e is a cylinder map of the lens of Example 4.

In FIG. 3e is depicted the cylinder map for the lens produced by combining the first and second surfaces. The lens has a distance power of −0.03 diopters and +2.00 dioptric add power. The resulting lens contains a single maximum, localized unwanted astigmatism area located on either side of the channel. The magnitude of this area is 1.68 diopters, a value less than the combined maximum of 1.73 diopter sum of the surface used to form the lens. The astigmatism is located at $x=14.1$ mm and $y=-7.4$ mm. The optical parameters for the lens listed on Table 4 are comparable to conventional progressive lenses.

TABLE 4*

| Parameter | Ex. 4 | Ex. 5 | Ex. 6 | Ex. 7 |
|---|---|---|---|---|
| Distance Width @ y = +10 deg. | 77.4 | 45.0 | 49.1 | 69.1 | 68.6 |
| Distance Width @ y = 0 deg. | 27.0 | 19.4 | 24.2 | 23.3 | 42.1 |
| Distance Width @ y = −10 deg. | 17.7 | 23.8 | 34.8 | 26.3 | 32.1 |
| Reading Width @ y = −30 deg. | 20.2 | 22.5 | 21.2 | 22.0 | 16.9 |
| Reading Width @ y = −40 deg. | 35.2 | 32.0 | 27.6 | 35.1 | 25.3 |
| Channel Width | 13.5 | 20.7 | 21.1 | 19.7 | 16.4 |
| Channel Length | 29.0 | 31.0 | 35.0 | 32.0 | 40.0 |
| Max. Astigmatism | 2.46 | 1.68 | 1.60 | 1.62 | 1.61 |
| Max. Astigmatism location | (16.8, −12.1) | (14.2, −6.2) | (15.8, −13.4) | (15.6, −6.1) | (11, −12.2) |

*Linear dimensions are in degrees, powers in diopters, and coordinates in mm.

Example 5

Figure 4A:
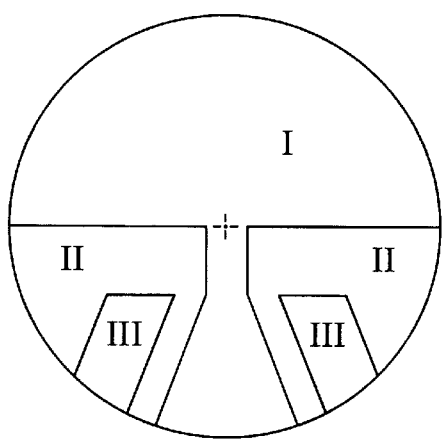
FIG. 4a is a weighting function map of a surface used in the lens of the invention.
Figure 4B:
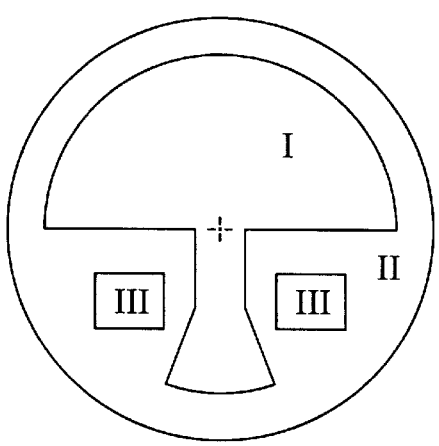
FIG. 4b is a weighting function map of another surface used in a lens of the invention.
Figure 4C:
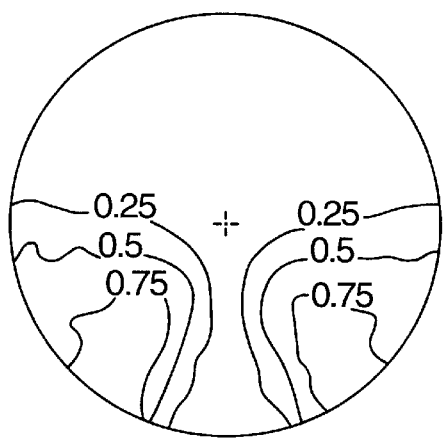
Figure 4D:
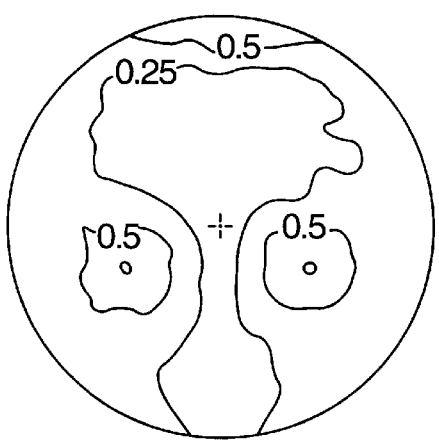
FIG. 4d is a cylinder map of the surface of FIG. 4b.
Figure 4E:
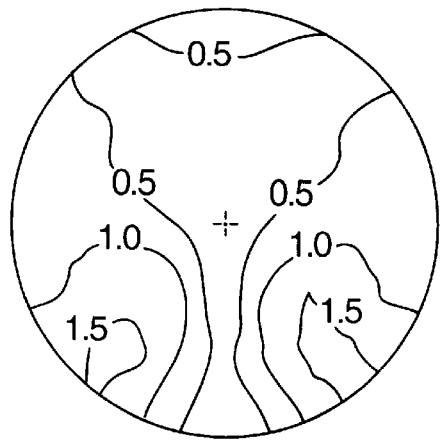
FIG. 4e is a cylinder map of the lens of Example 5.

The lens of Example 5 was produced using the same weighting functions as used for the surfaces of Example 4. The weighting function maps are shown in FIGS. 4a and 4b and cylinder contour maps in FIGS. 4c and 4d. The concave surface was shifted vertically downwards by 4 mm and then combined with the convex surface to produce a lens with the optical parameters shown on Table 4. The cylinder contour map of the resultant lens is shown In FIG. 4e. As can be seen, the maximum, unwanted astigmatism is reduced from 1.68 diopters to 1.60 diopters and the location of the maximum on the lens is lowered by 6 mm. The channel length is increased by 4 mm. By comparison of Example 5 with Example 4, it is demonstrated that a lower maximum of unwanted astigmatism for the lens may be achieved by shifting one surface relative to the other.

Example 6

Figure 5A:
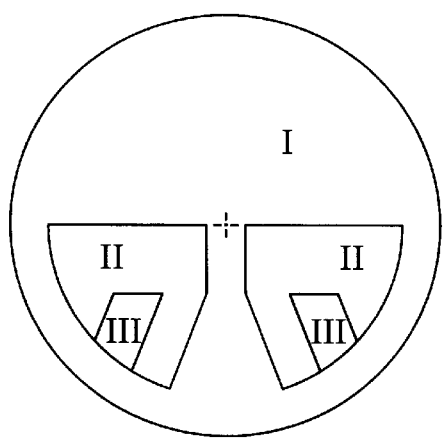
FIG. 5a is a weighting function map of a surface used in the lens of the invention.

For a first progressive addition concave surface, the refractive power distribution of the distance and near portions of the surface were determined along with the base radii of curvature corresponding to this distribution, which distribution was 112.7 mm base curvature for the distance viewing zone and 94.5 mm for the near viewing zone. The add power was +1.00 diopters. The procedure of Example 1 was used to complete the designing of the surface. In FIG. 5a is depicted the weighting function map used for the surface.

Figure 5B:
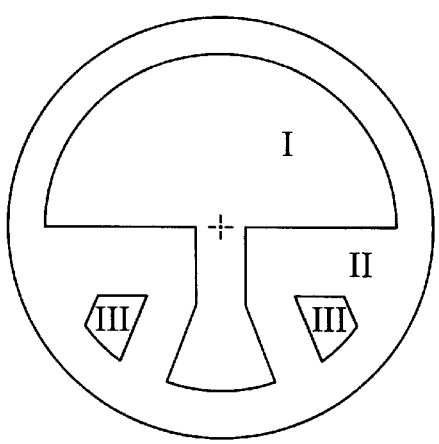
FIG. 5b is a weighting function map of another surface used in a lens of the invention.
Figure 5C:
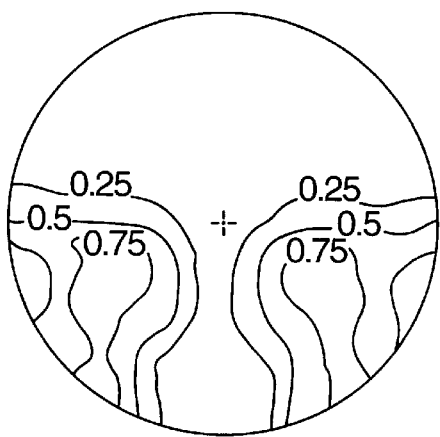

The distance zone for the first surface was spherical and the design was a hard design with a channel length of 32 degrees. The maximum, localized unwanted astigmatism was 0.97 diopters at x=15 mm, y=−6 mm. The cylinder contour map for the surface is seen in FIG. 5c. The prism reference point used was x=0, y=0.

For a second progressive addition convex surface, the refractive power distribution of the distance and near portions of the surface were determined along with the base radii of curvature corresponding to this distribution, which distribution was 115.2 mm base curvature for the distance viewing zone and 96.3 mm for the near viewing zone. The add power was +1.00 diopters. The procedure of Example 1 was used to complete the designing of the surface. In FIG. 5b is depicted the weighting function map used for the surface.

Figure 5D:
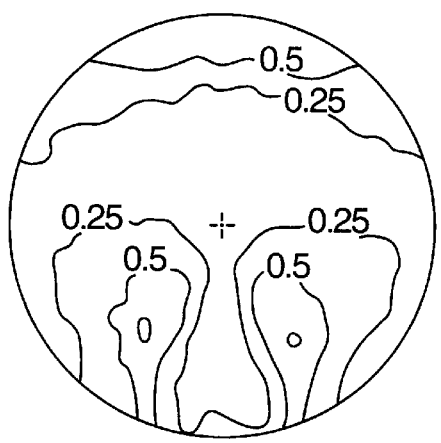
FIG. 5d is a cylinder map of the surface of FIG. 5b.

The distance zone for the second surface was aspherical and the design was a soft design with a channel length of 28 degrees. The maximum, localized unwanted astigmatism was 0.79 diopters at x=−9 mm, y=−18 mm. The cylinder contour map for the surface is seen in FIG. 5d. The prism reference point used was x=0, y=0.

Figure 5E:
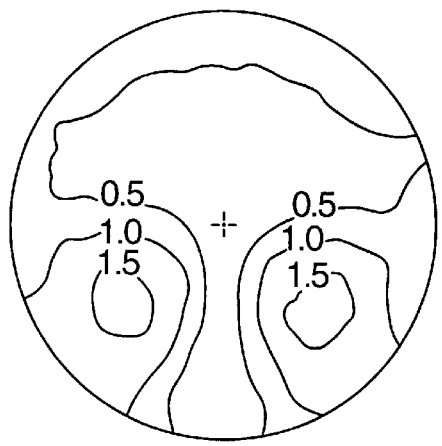
FIG. 5e is a cylinder map of the lens of Example 6.

In FIG. 5e is depicted the cylinder map for the lens produced by combining the first and second surfaces. The lens has a distance power of −0.03 diopters and +2.00 dioptric add power. The resulting lens contains a broad plateau of maximum, localized unwanted astigmatism area located on either side of the channel. The magnitude of this area is 1.62 diopters, a value less than the combined maximum of 1.76 diopter sum of the surface used to form the lens. The astigmatism is located at x=15 mm and y=−6.1 mm. The other optical parameters for this lens are listed on Table 4 and are comparable to a prior art progressive addition lens

Example 7

Figure 6A:
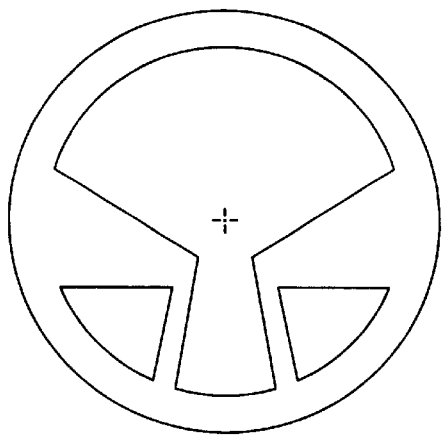
FIG. 6a is a weighting function map of a surface used in the lens of the invention.

For a first progressive addition concave surface, the refractive power distribution of the distance and near portions of the surface were determined along with the base radii of curvature corresponding to this distribution, which distribution was 82.7 mm base curvature for the distance viewing zone and 74.5 mm for the near viewing zone. The add power was +1.00 diopters. The procedure of Example 1 was used to complete the designing of the surface. In FIG. 6a is depicted the weighting function map used for the surface.

Figure 6B:
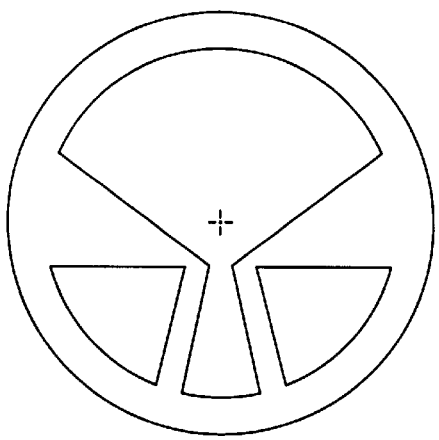
FIG. 6b is a weighting function map of another surface used in a lens of the invention.
Figure 6C:
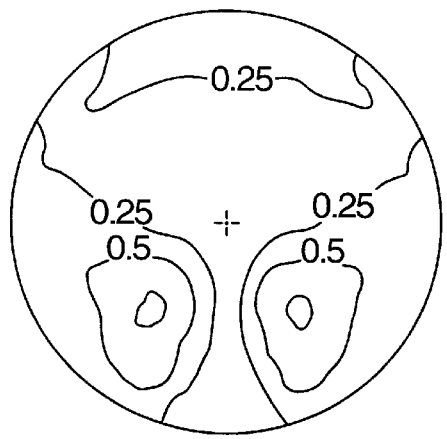

The distance zone for the first surface was aspherical and the design was a soft design with a channel length of 36 degrees. The maximum, localized unwanted astigmatism was 0.78 diopters at x=−11 mm, y=−15 mm. The cylinder contour map for the surface is seen in FIG. 6c. The prism reference point used was x=0, y=0.

For a second progressive addition convex surface, the refractive power distribution of the distance and near portions of the surface were determined along with the base radii of curvature corresponding to this distribution, which distribution was 82.4 mm base curvature for the distance viewing zone and 72.2 mm for the near viewing zone. The add power was +1.00 diopters. The procedure of Example 1 was used to complete the designing of the surface. In FIG. 6b is depicted the weighting function map used for the surface.

Figure 6D:
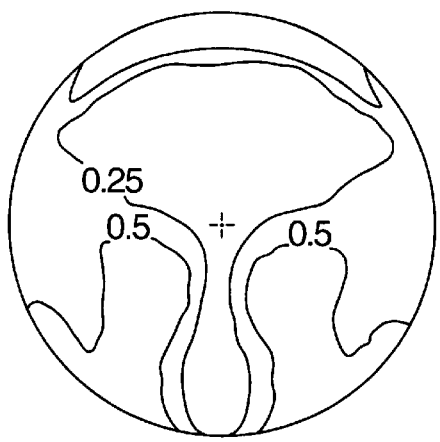
FIG. 6d is a cylinder map of the surface of FIG. 5b.

The distance zone for the second surface was aspherical and the design was a soft design with a channel length of 36 degrees. The maximum, localized unwanted astigmatism was 0.75 diopters at x=10 mm, y=−9 mm. The cylinder contour map for the surface is seen in FIG. 6d. The prism reference point used was x=0, y=0.

Figure 6E:
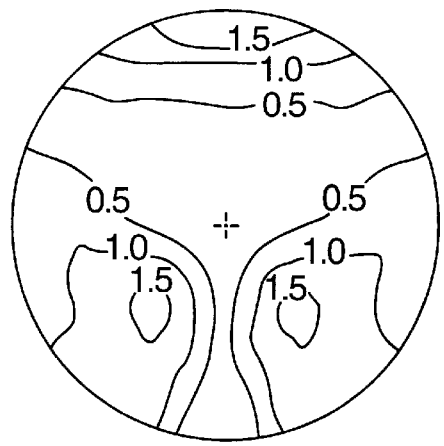
FIG. 6e is a cylinder map of the lens of Example 7.

In FIG. 6e is depicted the cylinder map for the lens produced by combining the first and second surfaces. The concave surface was shifted vertically downwards by 4 mm and the combined with the convex surface to produce the lens with the optical parameters shown on Table 4. The lens has a distance power of 0.10 diopters and +2.00 dioptric add power. The resulting lens contains a single broad plateau of maximum, localized unwanted astigmatism area located on either side of the channel and exhibits an aspheric distance zone outside of a 20 mm radius circle. The magnitude of this area is 1.61 diopters, a value less than the combined maximum of 1.53 diopter sum of the surface used to form the lens. The astigmatism is located at x=11 mm and y=−12.2 mm. The other optical parameters for this lens are listed on Table 4 and are comparable to a prior art progressive addition lens.

What is claimed is:

1. A process for producing a lens comprising the steps of: a.) providing refractive power distributions for at least a first and a second progressive addition surface; b.) dividing the first and second progressive surfaces into a plurality of sections; c.) expressing the shape of each of the first and second progressive surfaces by use of curved-surface equations for each of the plurality of sections; d.) combining the first and second progressive addition surfaces to form a lens wherein at least a portion of the areas of maximum, localized unwanted astigmatism of one surface are misaligned with respect to the areas of maximum, localized unwanted astigmatism of the other surface.

2. The process of claim 1, wherein all areas of maximum, localized unwanted astigmatism of one surface are misaligned with respect to all the areas of maximum, localized unwanted astigmatism of the other surface.

3. The process of claim 1, wherein the power distribution for each of the surfaces is different from that of the other surface.

4. The process of claim 1, wherein the power distribution for each of the surfaces is the same as that of the other surface.

5. The process of claim 1, wherein the shape of each of the plurality of sections is a polygon.

6. The process of claim 5, wherein the shape of each of the plurality of sections is triangular.

7. A process for producing a spectacle lens comprising the steps of: a.) providing refractive power distributions for at least a first and second progressive addition surface; b.) dividing the first and a second progressive surfaces into a plurality of sections; c.) expressing the shape of each of the first and second progressive surfaces by use of curved-surface equations for each of the plurality of sections; d.) combining the first and second progressive addition surfaces to form a lens wherein at least a portion of the areas of maximum, localized unwanted astigmatism of one surface are misaligned with respect to the areas of maximum, localized unwanted astigmatism of the other surface.

8. The process of claim 7, wherein all areas of maximum, localized unwanted astigmatism of one surface are misaligned with respect to all the areas of maximum, localized unwanted astigmatism of the other surface.

9. The process of claim 7, wherein the power distribution for each of the surfaces is different from that of the other surface.

10. The process of claim 7, wherein the power distribution for each of the surfaces is the same as that of the other surface.

11. The process of claim 7, wherein the shape of each of the plurality of sections is a polygon.

12. The process of claim 7, wherein the shape of each of the plurality of sections is triangular.

13. A process for producing a spectacle lens comprising the steps of: a.) providing refractive power distributions for at least a first and a second progressive addition surface; b.) dividing the first and second progressive surfaces into a plurality of sections wherein the shape of each of the plurality of sections is triangular; c.) expressing the shape of each of the first and second progressive surfaces by use of curved-surface equations for each of the plurality of sections; d.) combining the first and second progressive addition surfaces to form a lens wherein at least a portion of the areas of maximum, localized unwanted astigmatism of one surface are misaligned with respect to the areas of maximum, localized unwanted astigmatism of the other surface.

14. The process of claim 13, wherein all areas of maximum, localized unwanted astigmatism of one surface are misaligned with respect to all the areas of maximum, localized unwanted astigmatism of the other surface.

15. The process of claim 13, wherein the power distribution for each of the surfaces is different from that of the other surface.

16. The process of claim 13, wherein the power distribution for each of the surfaces is the same as that of the other surface.

17. A lens produced by the process of claim 1.
18. A lens produced by the process of claim 7.
19. A lens produced by the process of claim 13.

* * * * *